US012610123B2

(12) United States Patent
Chien et al.

(10) Patent No.: US 12,610,123 B2
(45) Date of Patent: Apr. 21, 2026

(54) OBJECT DETECTION METHOD AND DEVICE

(71) Applicant: Chicony Electronics Co., Ltd., New Taipei City (TW)

(72) Inventors: Hsuan-Che Chien, New Taipei City (TW); Shang-Yuan Yuan, New Taipei City (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 391 days.

(21) Appl. No.: 18/321,796

(22) Filed: May 23, 2023

(65) Prior Publication Data

US 2024/0267607 A1 Aug. 8, 2024

(30) Foreign Application Priority Data

Feb. 2, 2023 (TW) .................................. 112103635

(51) Int. Cl.
*H04N 23/61* (2023.01)
*G01J 5/00* (2022.01)
*G01S 7/4865* (2020.01)
*G01S 13/04* (2006.01)

(52) U.S. Cl.
CPC ............ *H04N 23/61* (2023.01); *G01J 5/0022* (2013.01); *G01S 7/4865* (2013.01); *G01S 13/04* (2013.01)

(58) Field of Classification Search
None
See application file for complete search history.

(56) References Cited

U.S. PATENT DOCUMENTS

| | | | | |
|---|---|---|---|---|
| 10,816,939 | B1* | 10/2020 | Coleman | ................. G01S 17/86 |
| 11,863,911 | B2* | 1/2024 | Hoshino | ................ H04N 23/20 |
| 2020/0118310 | A1* | 4/2020 | Matsumoto | ........ B62D 15/0275 |
| 2021/0112647 | A1* | 4/2021 | Coleman | ................ G01S 17/42 |

FOREIGN PATENT DOCUMENTS

| | | |
|---|---|---|
| TW | 202109268 | 3/2021 |
| TW | I776741 | 9/2022 |

OTHER PUBLICATIONS

"Office Action of Taiwan Counterpart Application", issued on Sep. 5, 2023, pp. 1-7.

* cited by examiner

*Primary Examiner* — Darryl V Dottin
(74) *Attorney, Agent, or Firm* — JCIPRNET

(57) ABSTRACT

Embodiments of the disclosure provide an object detection method and device. The method includes: in response to a first object detection circuit determining that a moving object exists in an environment, activating a second object detection circuit to detect whether the moving object actually exists in the environment, wherein a power consumption of the first object detection circuit is lower than a power consumption of the second object detection circuit; in response to the second object detection circuit determining that the moving object actually exists in the environment, activating an image capturing circuit, and capturing an environmental image corresponding to the environment by using the image capturing circuit.

10 Claims, 1 Drawing Sheet

OBJECT DETECTION METHOD AND DEVICE

CROSS-REFERENCE TO RELATED APPLICATION

This application claims the priority benefit of Taiwan application serial no. 112103635, filed on Feb. 2, 2023. The entirety of the above-mentioned patent application is hereby incorporated by reference herein and made a part of this specification.

BACKGROUND

Technical Field

The disclosure relates to an object detection method and device, and in particular relates to an object detection method and device capable of saving power.

Description of Related Art

With the development of time, there are more and more outdoor camera monitoring devices powered by batteries. Due to the limited battery capacity, most of these devices are equipped with extremely power-saving pyroelectric infrared detector (PIR) sensors to sense living things. Generally speaking, when the PIR sensor determines that a living thing has been sensed, the above-mentioned device correspondingly activates the main system and the image capturing circuit, and performs further identification based on the images captured by the image capturing circuit. In this way, the main system and the image capturing circuit may be set to be turned off at ordinary times, thereby achieving the effect of saving power and extending working time.

However, since the PIR sensor is more sensitive to temperature, misjudgments often occur due to changes in the environment or weather. In this case, the main system and the image capturing circuit are often woken up needlessly, resulting in unnecessary power consumption.

SUMMARY

In view of this, the disclosure provides an object detection method and device, which may be used to solve the aforementioned technical issues.

An embodiment of the disclosure provides an object detection method, including the following operation. In response to a first object detection circuit determining that a moving object exists in an environment, a second object detection circuit is activated to detect whether the moving object actually exists in the environment, in which a power consumption of the first object detection circuit is lower than a power consumption of the second object detection circuit. In response to the second object detection circuit determining that the moving object actually exists in the environment, an image capturing circuit is activated, and an environmental image corresponding to the environment is captured by using the image capturing circuit.

An embodiment of the disclosure provides an object detection device, including a first object detection circuit, a second object detection circuit, an image capturing circuit, and a processor. The processor is coupled to the first object detection circuit, the second object detection circuit, and the image capturing circuit, and configured to perform the following operation. In response to a first object detection circuit determining that a moving object exists in an environment, a second object detection circuit is activated to detect whether the moving object actually exists in the environment, in which a power consumption of the first object detection circuit is lower than a power consumption of the second object detection circuit. In response to the second object detection circuit determining that the moving object actually exists in the environment, an image capturing circuit is activated, and an environmental image corresponding to the environment is captured by using the image capturing circuit.

DETAILED DESCRIPTION OF DISCLOSED EMBODIMENTS

Figure 1:
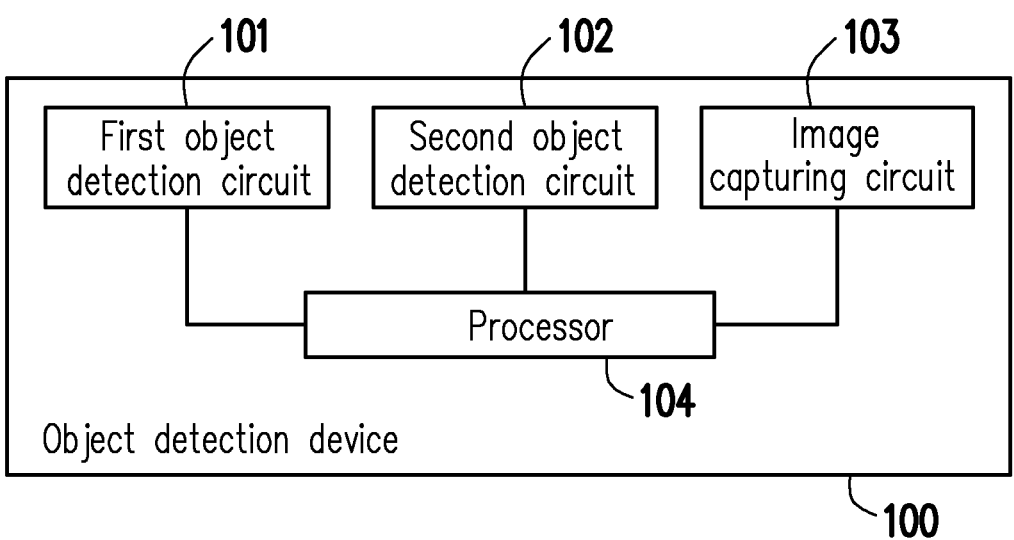
FIG. 1 is a schematic diagram of an object detection device according to an embodiment of the disclosure.

Referring to FIG. 1, FIG. 1 is a schematic diagram of an object detection device according to an embodiment of the disclosure. In different embodiments, the object detection device 100 may be, for example, implemented as various camera devices powered by batteries, but not limited thereto.

In FIG. 1, an object detection device 100 includes a first object detection circuit 101, a second object detection circuit 102, an image capturing circuit 103, and a processor 104.

In the embodiment of the disclosure, the power consumption of the first object detection circuit 101 is lower than the power consumption of the second object detection circuit 102. In one embodiment, the first object detection circuit 101 is, for example, at least one of an infrared sensing circuit (e.g., a PIR sensor) and a time-of-flight circuit, but not limited thereto. In addition, the second object detection circuit 102 is, for example, a millimeter wave radar circuit, but not limited thereto.

In different embodiments, the image capturing circuit 103 may capture an environmental image of the environment where the object detection device 100 is located based on an image capturing range. In one embodiment, the image capturing range is, for example, the monitoring range of the object detection device 100, but not limited thereto.

The processor 104 is coupled to the first object detection circuit 101, the second object detection circuit 102 and the image capturing circuit 103, and may be a general purpose processor, a special purpose processor, a conventional processor, a digital signal processor, multiple microprocessors, one or more combined digital signal processing microprocessor, a controller, a microcontroller, an application specific integrated circuit (ASIC), a field programmable gate array (FPGA), any other type of integrated circuit, state machine, advanced RISC machine (ARM) based processor and the like.

In the embodiment of the disclosure, the processor 104 may access specific modules and program codes to implement the object detection method proposed by the disclosure, the details of which are described below.

Figure 2:
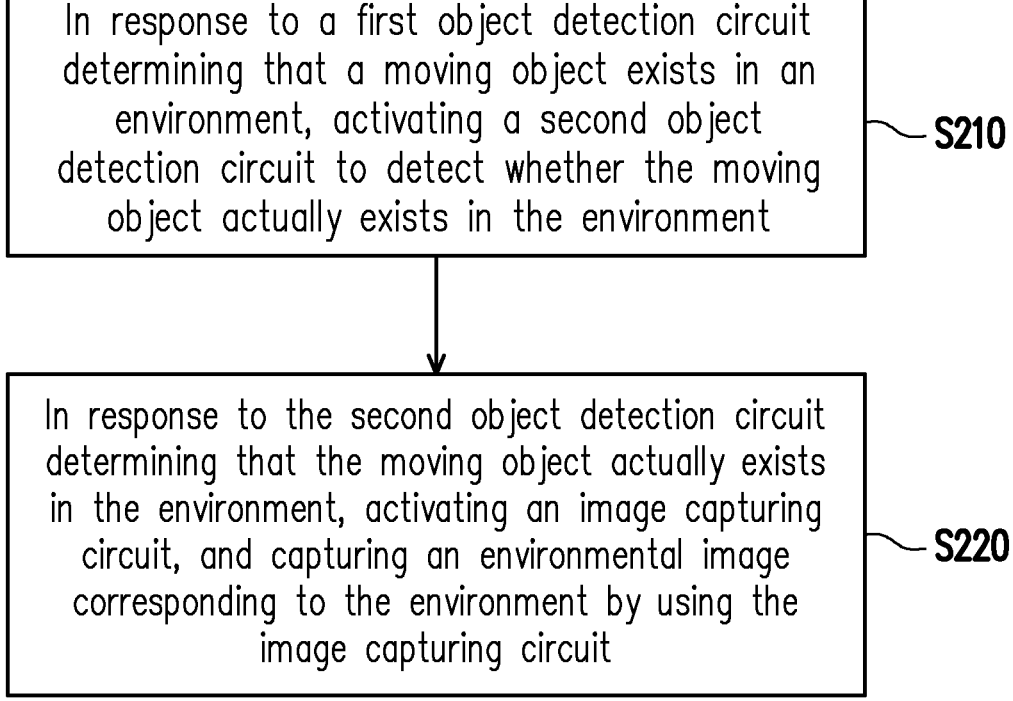
FIG. 2 is a flowchart of an object detection method according to an embodiment of the disclosure.

Referring to FIG. 2, FIG. 2 is a flowchart of an object detection method according to an embodiment of the disclosure. The method of this embodiment may be executed by the object detection device 100 in FIG. 1, and the details of each step in FIG. 2 will be described below with reference to the elements shown in FIG. 1.

In the embodiment of the disclosure, for example, the second object detection circuit 102 and the image capturing circuit 103 may be preset to be turned off, and the first object detection circuit 101 may be preset to be turned on to detect whether a moving object exists in the environment where the object detection device 100 is located.

In the first embodiment, in response to the first object detection circuit 101 determining that the number of temperature changes within a specific time interval reaches a quantity threshold, the first object detection circuit 101 may determine that a moving object exists in the environment.

In the second embodiment, in response to the first object detection circuit 101 determining that a temperature change greater than a predetermined magnitude occurs, the first object detection circuit 101 may determine that a moving object exists in the environment, but not limited thereto.

Based on this, in step S210, in response to the first object detection circuit 101 determining that a moving object exists in the environment, the processor 104 activates the second object detection circuit 102 to detect whether a moving object actually exists in the environment.

Next, in step S220, in response to the second object detection circuit 102 determining that a moving object actually exists in the environment, the processor 104 activates the image capturing circuit 103 and captures an environmental image corresponding to the environment by using the image capturing circuit 103.

For ease of description, it is assumed below that the first object detection circuit 101 and the second object detection circuit 102 are respectively PIR sensors and millimeter wave radar circuits, but this is only for example and not intended to limit the possible implementation of the disclosure. In other embodiments, the designer may determine the circuits used to realize the first object detection circuit 101 and the second object detection circuit 102 according to requirements.

In the above situation, the PIR sensor (i.e., the first object detection circuit 101), for example, may be turned on all the time to detect whether a moving object exists in the environment. In one embodiment, the PIR sensor may detect whether a moving object exists in the environment based on the method described in the first and/or second embodiment, but not limited thereto.

As mentioned earlier, although the power consumption of the PIR sensor is low, its detection performance is easily affected by environmental factors. Therefore, if the processor 104 activates the image capturing circuit 103 directly because the PIR sensor determines that a moving object exists in the environment, the captured environmental image may not include any moving object. In this case, the object detection device 100 may cause unnecessary power consumption due to unnecessary activation of the image capturing circuit 103.

In order to improve the above problems, the method of the disclosure allows the processor 104 to not directly activate the image capturing circuit 102 to capture the environmental image when the PIR sensor determines that a moving object exists in the environment, but instead activates the millimeter wave radar circuit to detect whether a moving object actually exists in the environment.

Generally speaking, although the power consumption of the millimeter wave radar circuit (i.e., the second object detection circuit 102) is higher than that of the PIR sensor, the detection accuracy is also higher. Therefore, when the millimeter wave radar circuit determines that no moving object exists in the environment, the probability that the moving object does not exist is also high. In this case, the processor 104 may turn off the millimeter wave radar circuit and not activate the image capturing circuit 103, so as to save power consumption of the object detection device 100.

On the other hand, when the millimeter wave radar circuit determines that a moving object actually exists in the environment, the probability that the moving object does exist is also high. Based on this, when the millimeter wave radar circuit determines that a moving object actually exists in the environment, the processor 104 may correspondingly activate the image capturing circuit 103 to capture the environmental image. Thereby, the image capturing circuit 103 may capture the environmental image including the moving object with a higher probability. In this case, the subsequent object recognition operation (e.g., recognizing the shape and type of the moving object) performed by the processor 104 based on the environmental image is more accurate and effective.

It may be seen that, the method of the embodiment of the disclosure may reduce the probability of the image capturing circuit being unnecessarily activated, thereby achieving the effect of saving the power consumption of the object detection device 100.

In some embodiments, if the processor 104 activates the second object detection circuit 102 repeatedly because the first object detection circuit 101 continuously determines that a moving object exists in the environment, but the second object detection circuit 102 determines repeatedly that no moving object exists in the environment, this means that the detection sensitivity of the first object detection circuit 101 may be too high. Therefore, the embodiment of the disclosure may correspondingly reduce the detection sensitivity of the first object detection circuit 101 when the detection sensitivity of the first object detection circuit 101 is too high.

In one embodiment, in response to the second object detection circuit 102 determining that no moving object exists in the environment (i.e., the first object detection circuit 101 has a misjudgment), the processor 104 may not only turn off the second object detection circuit 102 and not activate the image capturing circuit 103, but also increment the accumulated error count corresponding to the first object detection circuit 101.

In an embodiment, the processor 104 may determine whether the accumulated error count reaches a first threshold within a specified time. If yes, it means that the first object detection circuit 101 may frequently make misjudgments due to the high detection sensitivity. Based on this, the processor 104 may reduce the detection sensitivity of the first object detection circuit 101 accordingly.

On the other hand, if the accumulated error count does not reach the first threshold within the specified time, it means that the misjudgment situation of the first object detection circuit 101 is acceptable, so the processor 104 may maintain the detection sensitivity of the first object detection circuit 101 accordingly, and reset the accumulated error count, but not limited thereto.

In different embodiments, the processor 104 may use different methods to reduce the detection sensitivity of the first object detection circuit 101.

For example, in the first embodiment, the processor 104 may reduce the detection sensitivity of the first object detection circuit 101 by increasing the quantity threshold. In this case, the first object detection circuit 101 determines that a moving object exists in the environment only when more temperature changes occur within a specific time interval.

In the second embodiment, the processor 104 may for example, reduce the detection sensitivity of the first object detection circuit 101 by increasing the predetermined magnitude. In this case, the first object detection circuit 101 determines that a moving object exists in the environment only when it determines that a larger temperature change occurs.

Thereby, the misjudgment situation of the first object detection circuit 101 may be correspondingly improved. Moreover, since the frequency of the second object detection circuit 102 being mistakenly activated is correspondingly reduced, the power consumption of the object detection device 100 may be further reduced.

To sum up, in the method of the embodiment of the disclosure, when the first object detection circuit determines that a moving object is detected, the second object detection circuit is correspondingly activated to confirm whether the moving object actually exists. If the second object detection circuit also detects a moving object, the image capturing circuit with higher power consumption may be correspondingly activated to capture the environmental image and perform subsequent object recognition operations. On the other hand, if the second object detection circuit determines that no moving object is detected, the image capturing circuit will not be activated. In this way, extra power consumption caused by unnecessary activation of the image capturing circuit may be avoided.

In addition, the embodiment of the disclosure may also adaptively reduce the detection sensitivity of the first object detection circuit according to the misjudgment situation of the first object detection circuit. Therefore, the probability of the second object detection circuit being activated may be correspondingly reduced, thereby further saving the power consumption of the object detection device.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An object detection method, comprising:
in response to a first object detection circuit determining that a moving object exists in an environment, activating a second object detection circuit to detect whether the moving object actually exists in the environment, wherein a power consumption of the first object detection circuit is lower than a power consumption of the second object detection circuit;
in response to the second object detection circuit determining that the moving object actually exists in the environment, activating an image capturing circuit, and capturing an environmental image corresponding to the environment by using the image capturing circuit;
in response to the second object detection circuit determining that the moving object does not exist in the environment, adjusting a detection sensitivity of the first object detection circuit;
in response to the second object detection circuit determining that no moving object exists in the environment, turning off the second object detection circuit and not activating the image capturing circuit;
incrementing an accumulated error count corresponding to the first object detection circuit;
in response to determining that the accumulated error count reaches a first threshold within a specified time, reducing the detection sensitivity of the first object detection circuit; and

in response to determining that the accumulated error count does not reach the first threshold within the specified time, resetting the accumulated error count, and maintaining the detection sensitivity of the first object detection circuit.

2. The method according to claim 1, wherein the first object detection circuit comprises at least one of an infrared sensing circuit and a time-of-flight circuit.

3. The method according to claim 1, wherein the second object detection circuit comprises a millimeter wave radar circuit.

4. The method according to claim 1, further comprising:
in response to the first object detection circuit determining that a number of temperature changes within a specific time interval reaches a quantity threshold, determining that the moving object exists in the environment by the first object detection circuit, wherein reducing the detection sensitivity of the first object detection circuit comprises:
increasing the quantity threshold.

5. The method according to claim 1, further comprising:
in response to the first object detection circuit determining that a temperature change greater than a predetermined magnitude occurs, determining that the moving object exists in the environment by the first object detection circuit, wherein reducing the detection sensitivity of the first object detection circuit comprises:
increasing the predetermined magnitude.

6. An object detection device, comprising:
a first object detection circuit;
a second object detection circuit;
an image capturing circuit; and
a processor, coupled to the first object detection circuit, the second object detection circuit, and the image capturing circuit, and configured to:
in response to the first object detection circuit determining that a moving object exists in an environment, activate the second object detection circuit to detect whether the moving object actually exists in the environment, wherein a power consumption of the first object detection circuit is lower than a power consumption of the second object detection circuit;
in response to the second object detection circuit determining that the moving object actually exists in the environment, activate an image capturing circuit, and capture an environmental image corresponding to the environment by using the image capturing circuit;
in response to the second object detection circuit determining that the moving object does not exist in the environment, adjusting a detection sensitivity of the first object detection circuit;
in response to the second object detection circuit determining that no moving object exists in the environment, turning off the second object detection circuit and not activating the image capturing circuit;
incrementing an accumulated error count corresponding to the first object detection circuit;
in response to determining that the accumulated error count reaches a first threshold within a specified time, reducing the detection sensitivity of the first object detection circuit; and
in response to determining that the accumulated error count does not reach the first threshold within the specified time, resetting the accumulated error count, and maintaining the detection sensitivity of the first object detection circuit.

7. The object detection device according to claim 6, wherein the first object detection circuit comprises at least one of an infrared sensing circuit and a time-of-flight circuit.

8. The object detection device according to claim 6, wherein the second object detection circuit comprises a millimeter wave radar circuit.

9. The object detection device according to claim 6, wherein the processor further executes:

in response to the first object detection circuit determining that a number of temperature changes within a specific time interval reaches a quantity threshold, determining that the moving object exists in the environment by the first object detection circuit, wherein reducing the detection sensitivity of the first object detection circuit comprises:

increasing the quantity threshold.

10. The object detection device according to claim 6, wherein the processor further executes:

in response to the first object detection circuit determining that a temperature change greater than a predetermined magnitude occurs, determining that the moving object exists in the environment by the first object detection circuit, wherein reducing the detection sensitivity of the first object detection circuit comprises:

increasing the predetermined magnitude.

* * * * *